(12) United States Patent
Chen et al.

(10) Patent No.: US 7,753,541 B2
(45) Date of Patent: Jul. 13, 2010

(54) MOTOR VEHICLE

(75) Inventors: Pao Chen, Milpitas, CA (US); Derek Pai, San Francisco, CA (US); Brian Ng, Los Altos, CA (US); Arne Stoschek, Palo Alto, CA (US)

(73) Assignee: Volkswagen AG, Wolfsburg (DE)

( * ) Notice: Subject to any disclaimer, the term of this patent is extended or adjusted under 35 U.S.C. 154(b) by 379 days.

(21) Appl. No.: 11/437,573

(22) Filed: May 19, 2006

(65) Prior Publication Data

US 2007/0268718 A1   Nov. 22, 2007

(51) Int. Cl.
*F21V 9/16* (2006.01)
(52) U.S. Cl. .................. 362/84; 362/541; 362/498; 362/499
(58) Field of Classification Search ............... 362/84, 362/498, 499, 510, 541, 542; 427/64, 157
See application file for complete search history.

(56) References Cited

U.S. PATENT DOCUMENTS

| | | | |
|---|---|---|---|
| 4,904,508 A * | 2/1990 | Madonia | 428/31 |
| 5,213,711 A * | 5/1993 | Fast et al. | 252/301.35 |
| 5,709,453 A * | 1/1998 | Krent et al. | 362/496 |
| 5,808,407 A * | 9/1998 | Chung et al. | 313/485 |
| 6,037,865 A | 3/2000 | Müller et al. | |
| 6,242,056 B1 * | 6/2001 | Spencer et al. | 427/512 |
| 6,471,368 B1 | 10/2002 | Lin | |
| 6,851,843 B2 | 2/2005 | Muller et al. | |
| 6,893,147 B2 * | 5/2005 | Schottland et al. | 362/510 |
| 7,153,014 B1 * | 12/2006 | Kuhner | 362/544 |
| 2003/0012034 A1 * | 1/2003 | Misawa et al. | 362/545 |
| 2003/0077390 A1 * | 4/2003 | Potyrailo et al. | 427/372.2 |
| 2005/0068783 A1 * | 3/2005 | Egashira et al. | 362/487 |
| 2005/0158526 A1 * | 7/2005 | Ino et al. | 428/207 |
| 2006/0028815 A1 * | 2/2006 | Robin | 362/231 |
| 2007/0044704 A1 * | 3/2007 | Osborne et al. | 116/206 |
| 2007/0254149 A1 * | 11/2007 | Eckert | 428/339 |

FOREIGN PATENT DOCUMENTS

| | | |
|---|---|---|
| DE | 195 41 027 A1 | 2/1997 |
| DE | 297 19 025 U1 | 12/1997 |
| DE | 197 45 993 A1 | 4/1999 |
| DE | 200 08 348 U1 | 10/2000 |
| DE | 201 00 918 U1 | 3/2001 |
| DE | 101 21 596 A1 | 12/2001 |
| DE | 102 19 802 A1 | 12/2002 |

(Continued)

OTHER PUBLICATIONS

Rudolph Graf, 1974, Radio Shack Dictionary of Electronics, Howard W. Sams & Co. Inc, Fourth Edition.*

*Primary Examiner*—Sandra L O'Shea
*Assistant Examiner*—Evan Dzierzynski
(74) *Attorney, Agent, or Firm*—Laurence A. Greenberg; Werner H. Stemer; Ralph E. Locher

(57) ABSTRACT

A motor vehicle has an exterior coating. A fluorescing and/or phosphorescing substance is added to the exterior coating or forms a part of the exterior coating. The fluorescing and/or phosphorescing substance serves to emit light, in particular red, green and/or blue light, in a visible range upon irradiation by light in an invisible range.

6 Claims, 4 Drawing Sheets

FOREIGN PATENT DOCUMENTS

| | | |
|---|---|---|
| DE | 103 19 396 | 11/2004 |
| EP | 0 611 040 A1 | 8/1994 |
| EP | 0 771 859 A1 | 5/1997 |
| FR | 2 661 271 | 10/1991 |
| WO | WO 98/10957 | 3/1998 |

* cited by examiner

MOTOR VEHICLE

BACKGROUND OF THE INVENTION

Field of the Invention

The invention lies in the automotive technology field. More specifically, the invention relates to a motor vehicle having an exterior coating. It is an object of the invention to specify a highly brilliant exterior coating.

It is conventional to provide the exterior of a motor vehicle with lighting devices. Such lighting devices are disclosed, by way of example, in European published patent application EP 0 611 040 A1, in German published patent application DE 197 45 993 A1 and U.S. Pat. No. 6,037,865, and in German utility model DE 297 19 025 U1. European patent application EP 0 611 040 A1 discloses a motor vehicle whose vehicle body is provided in the region of its outer contour at the level of lateral trim strips with electroluminescent bands.

The above-mentioned German patent application DE 197 45 993 A1 and its counterpart U.S. Pat. No. 6,037,865 disclose a motor vehicle with an electroluminescent light band arranged in an associated depression in the body outer skin in such a way that on the outside it runs substantially flush with the adjoining body region. In accordance with the prior art description, this yields a smoothly running and therefore optically advantageous impression to the vehicle outer skin even in the region provided with the light band, by contrast with light bands that are simply applied in addition to the body outer skin, for example in the form of trim strips. It is further provided in this case that the electroluminescent light band extends continuously from a front headlight up to a tail light.

German utility model DE 297 19 025 U1 discloses a motor vehicle that has in an outer contour region of its vehicle body a number of electroluminescent means that are laid linearly on various contour sections. In the region of the rear fender, and also of the front fender, there is respectively provided a peripherally laid electroluminescent band that frames a plastic buffer section of the fender that extends over the entire width of the fender. An electroluminescent band is, additionally laid along a door sill below the side doors over the entire length of this door sill. A further electroluminescent strip extends in a region of the roof frame along a roof channel over both the side doors on each side of the motor vehicle. All the electroluminescent means are, in addition, connected to an onboard electric system fixed in the vehicle and driven by a central onboard controller.

German published patent application DE 103 19 396 A1 discloses a lighting device having an electroluminescent layer for lighting outer contours of a motor vehicle and of parts of a motor vehicle, the motor vehicle having a body provided with a coating layer, the electroluminescent layer being arranged between at least one part of the body and the coating layer.

It is a second object of the invention to render a motor vehicle distinguishable when viewed at a relatively great distance, doing so in a cost-effective way.

German utility model DE 201 00 918 U1 and its counterpart U.S. Patent No. U.S. Pat. No. 6,851,843 B2 describe a signal light, such as a tail light, for example, for motor vehicles, the tail light comprising a light housing whose housing opening is covered by a light lens, and in which at least one reflector and at least one light source are arranged, there being provided as light source at least one LED that is arranged in a cover in the housing and whose beams are partially reflected by the reflector to at least one light guide that is situated in the region between the reflector and the light lens. U.S. Pat. No. 6,471,368 discloses a ring that is arranged at a headlight and has fluorescing material. International PCT publication WO 98/10957 discloses a dashboard for a motor vehicle having a light source and fluorescing material.

It is an object of the invention to specify a motor vehicle having an exterior light that is virtually invisible to a viewer in the unlit state.

SUMMARY OF THE INVENTION

It is accordingly an object of the invention to provide a motor vehicle and an exterior light assembly for a motor vehicle which overcomes several disadvantages of the heretofore-known devices and methods of this general type and which achieves the above and other objects of the invention.

With the foregoing and other objects in view there is provided, in accordance with the invention, a motor vehicle having an exterior coating, the motor vehicle comprising a fluorescing and/or phosphorescing substance added to the exterior coating or a part of the exterior coating and serving for emitting light, in particular red, green and/or blue light, in a visible range upon irradiation by light in an invisible or non-visible range.

A fluorescing and/or phosphorescing substance in the meaning of the invention can also be a mixture of various fluorescing and/or phosphorescing substances. Specifically, the alternative recitation of one of the two substances does not exclude the respectively other substance.

In one refinement of the invention, the fluorescing or phosphorescing substance is transparent to light in the visible range.

In accordance with a refinement of the invention, the exterior coating comprises a transparent coating layer, in particular one that is transparent to light in the visible range, the fluorescing and/or phosphorescing substance being arranged in the coating layer that is, in particular, transparent to light in the visible range.

In a further refinement of the invention, the exterior coating comprises a coating layer that is opaque to light in the visible range, in particular, the fluorescing and/or phosphorescing substance being arranged in the coating layer, opaque, in particular, to light in the visible range.

Another of the above-named objects is achieved by way of a motor vehicle having a trim strip connected, in particular, to a body or a radiator grille, the motor vehicle comprising a fluorescing and/or phosphorescing substance, connected to the trim strip, for emitting light in a visible range upon irradiation by light in an invisible range.

In one refinement of the invention, the motor vehicle includes no light source that is provided for substantial irradiation of the trim strip.

The fluorescing and/or phosphorescing substance can be added to the trim strip or be arranged on it. The trim strip can, for example, be made from plastic (for example polycarbonate, acrylic, polypropylene, polyethylene etc.) and/or from metal (aluminum, chromium, steel etc.).

The above-named object is achieved by means of a motor vehicle having an exterior light, the exterior light comprising an at least partially transparent cover having a fluorescing and/or phosphorescing substance for emitting light in a visible range upon irradiation by light in an invisible range, and a light source, for example arranged on a side of the at least partially transparent cover averted from an outer side of the motor vehicle, predominantly or substantially exclusively for emitting light in the invisible range. Within the meaning of the invention, an exterior light of a motor vehicle is a functional light, in particular. A functional light in this meaning is a light for which there are statutory minimum requirements with reference to the luminous power, and/or that is prescribed by rules or regulations.

The fluorescing and/or phosphorescing substance can be added to the at least partially transparent cover or be arranged on it. The at least partially transparent cover can, for example, be made from glass or plastic (e.g. polycarbonate, acrylic, etc.).

In one refinement of the invention, the exterior light is configured as a brake light, tail light, light for a direction indicator and/or backup light.

In a further refinement of the invention, the at least partially transparent cover includes a color that corresponds at least partially to a color of an exterior coating of the motor vehicle.

In a further refinement of the invention, the at least partially transparent cover is a part of an outer skin of the motor vehicle.

The third above-named object is achieved by means of an exterior light having an at least partially transparent cover that comprises a fluorescing and/or phosphorescing substance for emitting light in a visible range upon irradiation by light in an invisible range, and a light source, arranged for example on a side averted from the outer side of the at least partially transparent cover, for emitting light, in particular for emitting light in the invisible range, in particular predominantly or substantially exclusively for emitting light in the invisible range.

In one refinement of the invention, the exterior light is configured as a brake light, tail light and/or backup light.

Within the meaning of the invention, a light source predominantly or substantially exclusively for emitting light in the invisible range is, in particular, a light source that emits invisible light to a substantial proportion. The invisible light can be near ultraviolet light, ultraviolet light, near infrared light or infrared light. A light source within the meaning of the invention can be, for example, an LED, a CCFL or an OLED.

A motor vehicle within the meaning of the invention is, in particular, a land vehicle that can be used individually in road traffic. Motor vehicles within the meaning of the inventions are, in particular, not restricted to land vehicles having an internal combustion engine.

Other features which are considered as characteristic for the invention are set forth in the appended claims.

Although the invention is illustrated and described herein as embodied in a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF PREFERRED EXEMPLARY EMBODIMENTS

Figure 1:
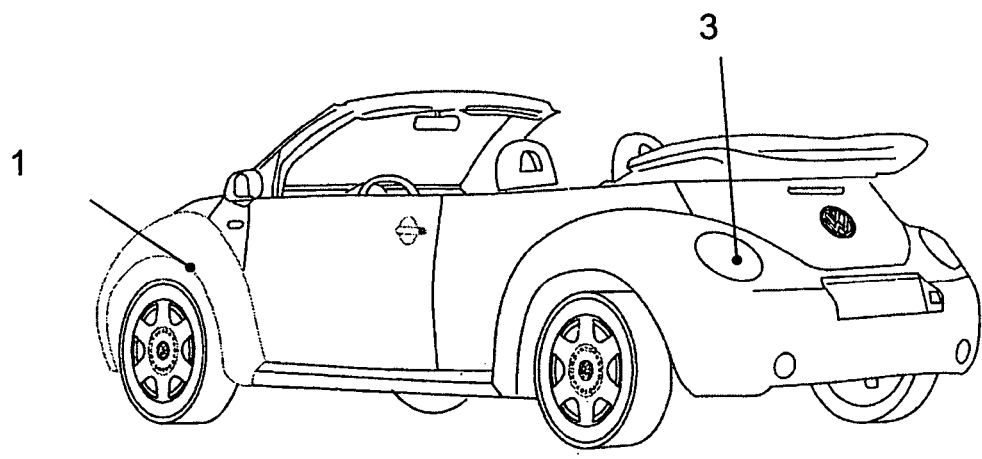
FIG. 1 is a perspective view of an exemplary embodiment of a motor vehicle.
Figure 2:
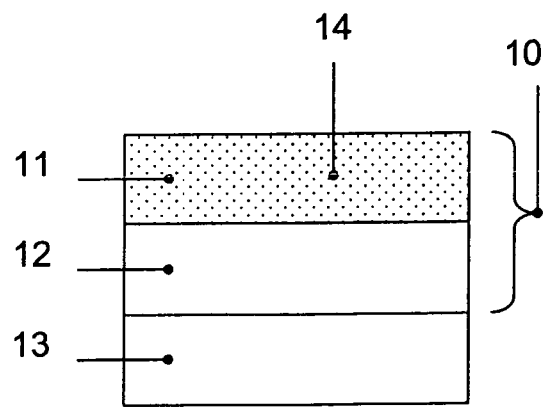
FIG. 2 is a partial diagrammatic view of an exemplary embodiment of an exterior coating of a motor vehicle.

Referring now to the figures of the drawing in detail and first, particularly, to FIG. 1 thereof, there is illustrated an exemplary embodiment of a motor vehicle 1 having an exterior light 3. FIG. 2 shows an exemplary embodiment of an exterior coating 10 of the motor vehicle 1. The exterior coating 10 is, at least partially, applied to the body 13 of the motor vehicle 1 and comprises at least a transparent coating layer 11 and an opaque coating layer 12. The transparent coating layer 11 and the opaque coating layer 12 can for their part each comprise a number of coating layers. As symbolized by the dots denoted by reference numerals 14, an added fluorescing and/or phosphorescing substance is provided in the transparent coating layer 11 for emitting light in a visible range upon irradiation by light in an invisible range.

Figure 3:
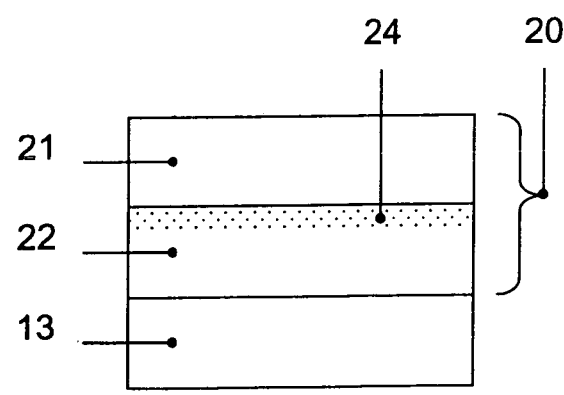
FIG. 3 is a similar view of a further exemplary embodiment of an exterior coating of a motor vehicle.

FIG. 3 shows an alternative exemplary embodiment of an exterior coating 20 for the motor vehicle 1. The exterior coating 20 is (at least partially) applied to the body 13 of the motor vehicle 1 and, like the exterior coating 10, comprises at least a transparent coating layer 21 and an opaque coating layer 22. The transparent coating layer 21 and the opaque coating layer 22 can for their part likewise each comprise a number of coating layers. As symbolized by the dots denoted by reference symbols 24, an added fluorescing and/or phosphorescing substance is provided in the opaque coating layer 22 for emitting light in a visible range upon irradiation by light in an invisible range.

The layers are drawn in FIGS. 2 and 3 with simplicity and clarity in mind and not necessarily to scale. Thus, for example, the orders of magnitude of some layers are represented exaggeratedly by comparison with other layers in order to improve the understanding of the exemplary embodiments of the present invention.

Figure 4:
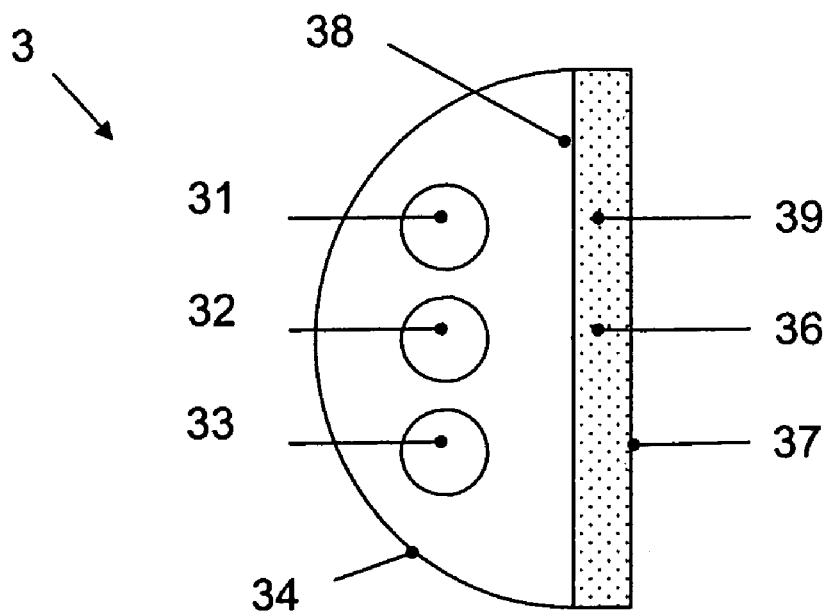
FIG. 4 shows an exemplary embodiment of an exterior light of a motor vehicle.

FIG. 4 shows an exemplary embodiment of a refinement of the exterior light 3. The exterior light 3 comprises three light sources 31, 32, 33 predominantly or substantially exclusively for emitting light in an invisible range, the light emitted by means of the light source 32 have a wavelength other than the light emitted by means of the light sources 31 and 33. The light sources 31, 32, 33 are arranged in a housing 34 covered by an least partially transparent cover 39. Reference symbol 37 denotes an outer side of the at least partially transparent cover 39, and reference symbol 38 denotes a side averted from the outer side 37 of the at least partially transparent cover 39.

As symbolized by the dots denoted by reference symbols 36, the at least partially transparent cover 39 comprises a fluorescing and/or phosphorescing substance for emitting light in a visible range upon irradiation by light emitted by the light sources 31, 32, 33 in the invisible range. Upon irradiation by red light emitted by the light sources 31 and 33, the fluorescing and/or phosphorescing substance emits red light, and upon irradiation by light emitted by the light source 32, it emits white light. The exterior light 3 is used to implement a brake light, a tail light and a backup light. If a function as tail light is desired, light source 31 is switched on. If a function as backup light is desired, light source 32 is switched on. If a function as brake light is desired, the light sources 31 and 33 are switched on.

Figure 5:
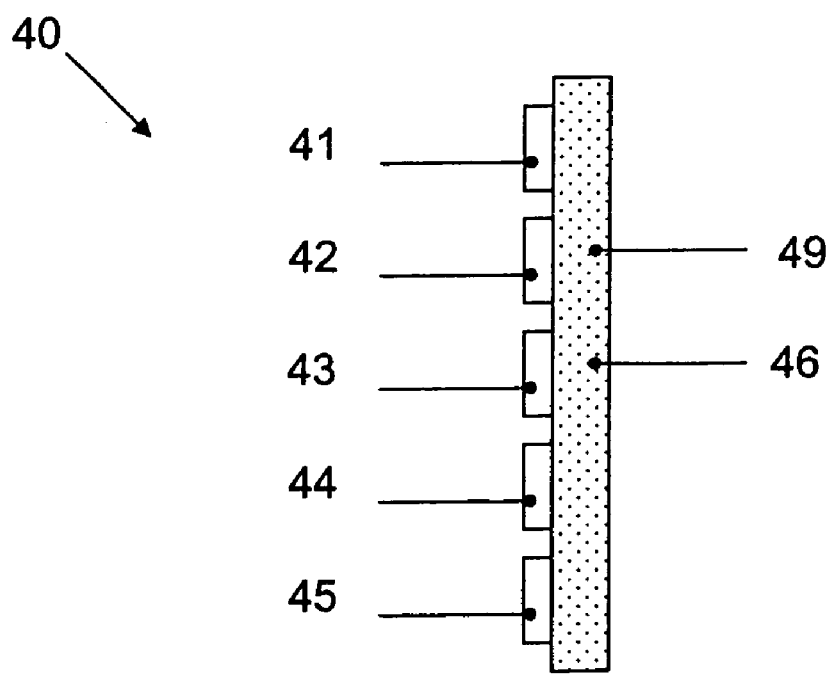
FIG. 5 shows a further exemplary embodiment of an exterior light of a motor vehicle.

FIG. 5 shows a further exemplary embodiment of an exterior light 40 for a motor vehicle. The exterior light 40 can be used, for example, alternatively to the exterior light 3. The exterior light 40 comprises five light sources 41, 42, 43, 44 and 45 predominantly or substantially exclusively for emitting light in an invisible range. The light sources 41, 42, 43, 44 and 45 are arranged on an at least partially transparent cover 49.

Light emitted by means of the light sources 41 and 43 has a wavelength other than the light emitted by means of the light sources 42, 44 and 45. Light emitted by means of the light sources 42 and 44 has a wavelength other than the light emitted by means of the light source 45. As symbolized by the dots denoted by reference symbols 46, the at least partially transparent cover 49 comprises a fluorescing and/or phosphorescing substance for emitting light in a visible range-upon irradiation by light emitted by the light sources 41, 42, 43, 44 and 45 in the invisible range. Upon irradiation by light emitted by the light sources 41 and 43, the fluorescing and/or phosphorescing substance emits red light, upon irradiation by light emitted by the light sources 42 and 44, it emits white light, and upon irradiation by light emitted by the light source 45, it emits yellow light. A brake light, a tail light, a direction indicator and a backup light are implemented by means of the exterior light 40. If a function as tail light is desired, the light source 41 is switched on, if a function as backup light is desired, the light sources 42 and 44 are switched on, if a function as brake light is desired, the light sources 41 and 43 are switched on, and if a function as direction indicator is desired, the light source 45 is switched on.

Figure 6:
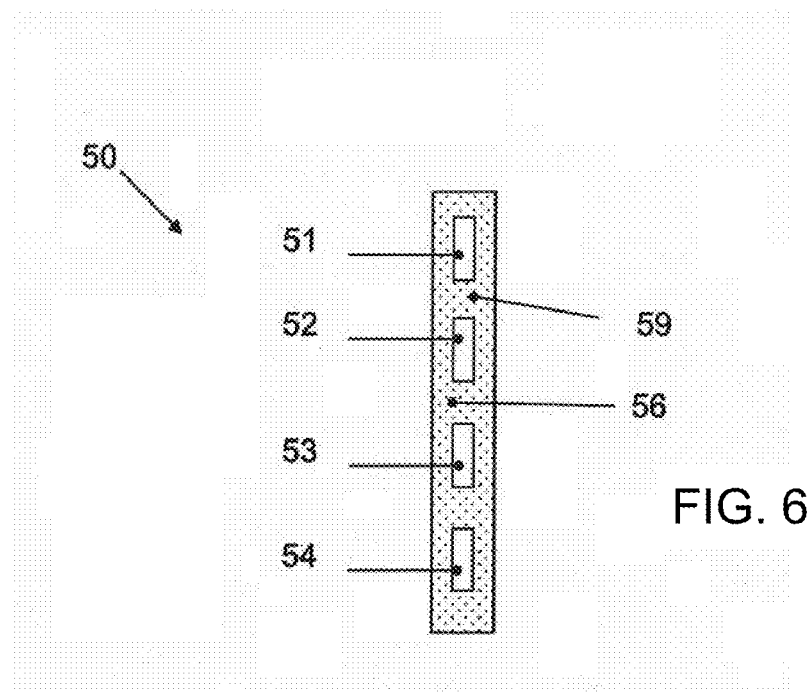
FIG. 6 shows a further exemplary embodiment of an exterior light of a motor vehicle.

FIG. 6 shows a further exemplary embodiment of an exterior light 50 for a motor vehicle. The exterior light 50 can be used, for example, alternatively to the exterior light 3. The exterior light 50 comprises four light sources 51, 52, 53 and 54 predominantly or substantially exclusively for emitting light in an invisible range. The light sources 51, 52, 53 and 54 are arranged in an at least partially transparent cover 59.

Light emitted by means of the light sources 51 and 53 has a wavelength other than the light emitted by means of the light sources 52 and 54. Light emitted by means of the light source 52 has a wavelength other than the light emitted by means of the light source 54. As symbolized by the dots denoted by reference symbols 56, the at least partially transparent cover 59 comprises a fluorescing and/or phosphorescing substance for emitting light in a visible range upon irradiation by light emitted by the light sources 51, 52, 53 and 54 in the invisible range. Upon irradiation by light emitted by the light sources 51 and 53, the fluorescing and/or phosphorescing substance emits red light, upon irradiation by light emitted by the light source 52, it emits white light, and upon irradiation by light emitted by the light source 54, it emits yellow light. A brake light, a tail light, a direction indicator and a backup light are implemented by means of the exterior light 50. If a function as tail light is desired, the light source 51 is switched on, if a function as backup light is desired, the light source 52 is switched on, if a function as brake light is desired, the light sources 51 and 53 are switched on, and if a function as direction indicator is desired, the light source 54 is switched on.

The at least partially transparent covers 39, 49, 59 can, for example, be made from glass or plastic (for example polycarbonate, acrylic etc.). The fluorescing and/or phosphorescing substance can be added to the at least partially transparent covers 39, 49, 59 or be arranged on them. The invisible light emitted by the light sources 31, 32, 33, 41, 42, 43, 44, 45, 51, 52, 53, 54 can be near ultraviolet light, ultraviolet light, near infrared light or infrared light. The light sources 31, 32, 33, 41, 42, 43, 44, 45, 51, 52, 53, 54 can, for example, be configured as LED, CCFL or OLED. It can be provided to arrange light sources laterally on the at least partially transparent cover.

Figure 7:
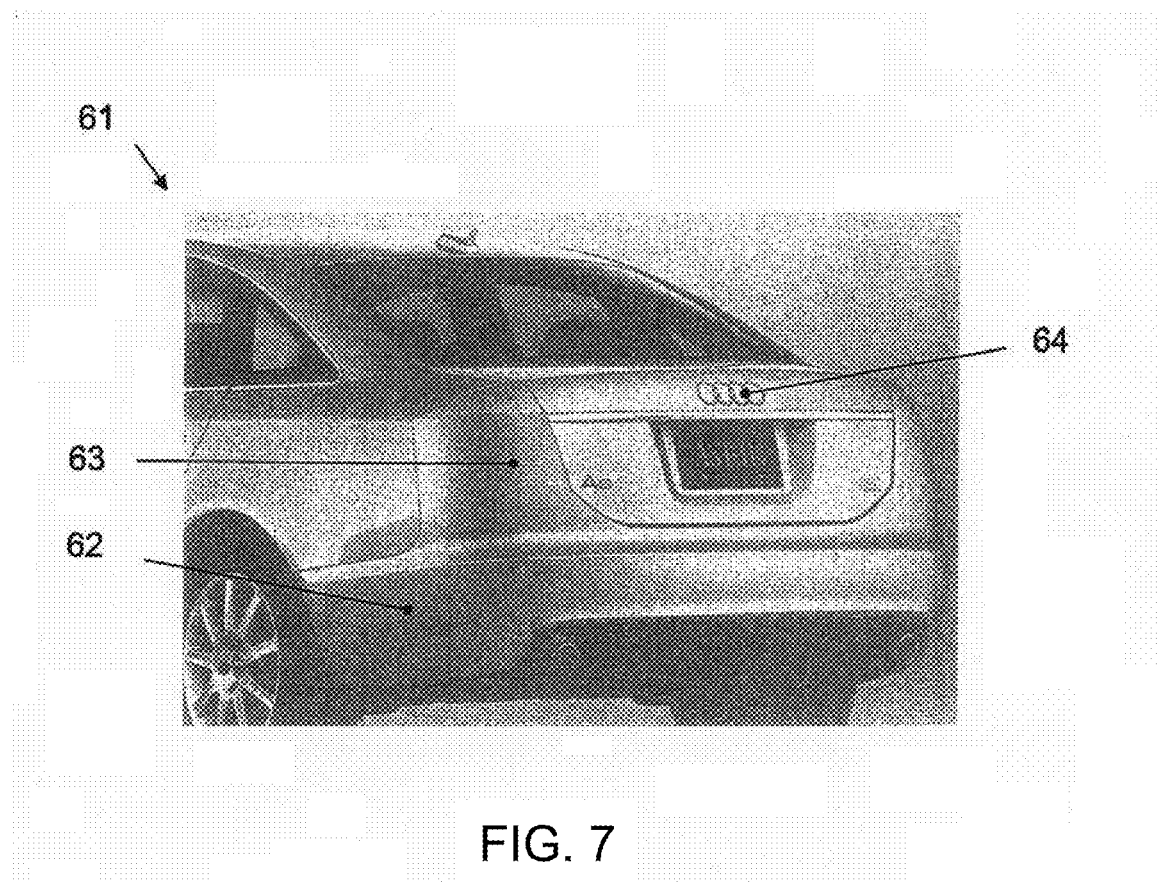
FIG. 7 shows a further exemplary embodiment of a motor vehicle.
Figure 8:
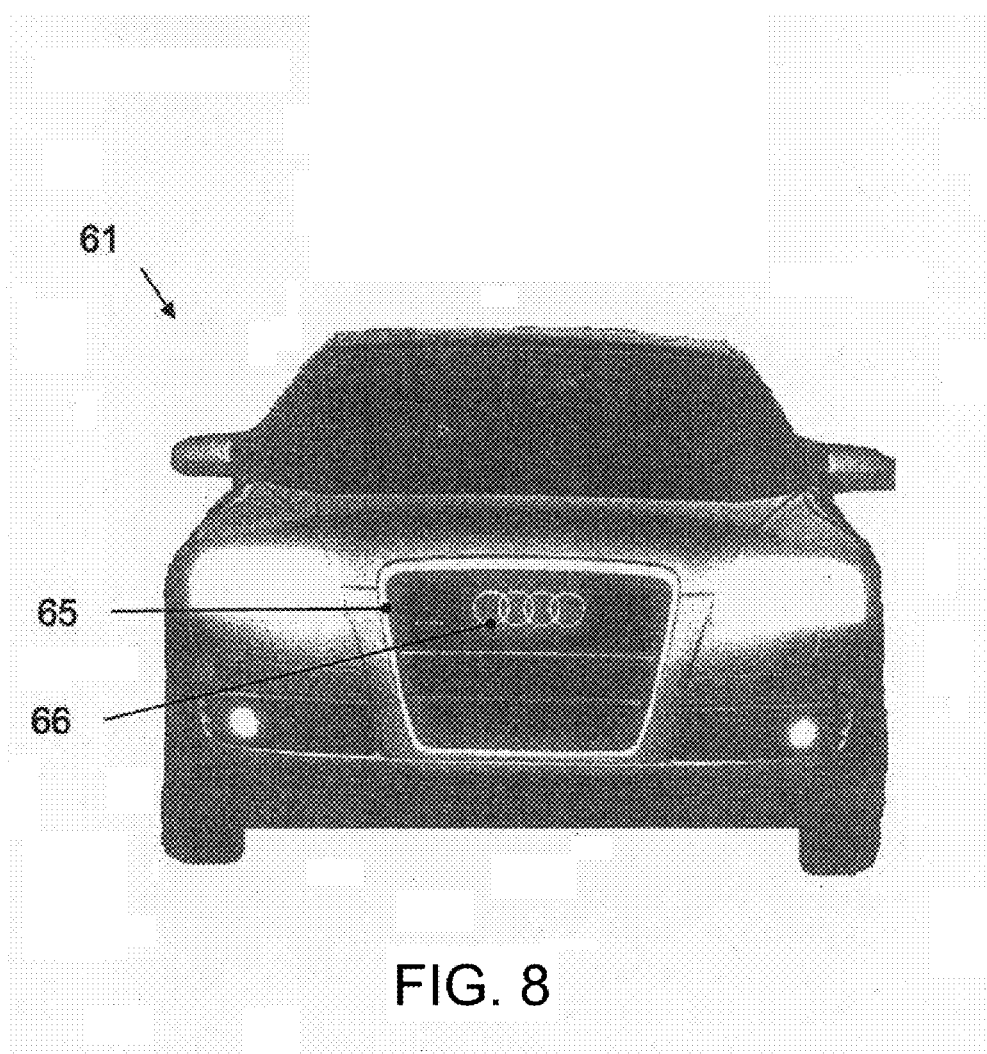
FIG. 8 shows the motor vehicle in a front view.

FIGS. 7 and 8 show a further exemplary embodiment of a motor vehicle 61, FIG. 7 showing a detail of the motor vehicle 61 in a rear perspective illustration, and FIG. 8 showing a motor vehicle 61 in a front view. The motor vehicle 61 comprises an exterior light 63 that is integrated in the outer skin 62 of the motor vehicle 61. The exterior light 63 is configured, in particular, in accordance with the exterior light 40 or 50. It is particularly provided in this case that the at least partially transparent cover 49 or 59 is part of the outer skin 62. Here, the at least partially transparent cover 49 or 59 includes a color that corresponds at least partially to a color of an exterior coating of the motor vehicle 61. The exterior light 63 is invisible, or virtually invisible, in the switched off state.

In addition, the motor vehicle 61 comprises trim strips 64, 65 and 66 having a fluorescing or phosphorescing substance for emitting light in a visible range upon irradiation by light in an invisible range. The fluorescing and/or phosphorescing substance can be added to the trim strips 64, 65 and 66 or be arranged on them. The trim strips 64, 65 and 66 can, for example, be made from plastic (for example polycarbonate, acrylic, polypropylene, polyethylene etc.) and/or from metal (aluminum, chromium, steel etc.).

We claim:

1. In combination with a motor vehicle, an exterior light comprising:
   an at least partially transparent cover, said at least partially transparent cover having a color that corresponds at least partially to a color of an exterior coating of the motor vehicle and including a fluorescing or phosphorescing substance for emitting light in a visible range upon irradiation by light in an invisible range; and
   a light source, assigned to said at least partially transparent cover, for emitting light substantially limited to a non-visible range; and
   wherein the exterior light is visible when said light source is switched on and substantially invisible when said light source is switched off.

2. The motor vehicle according to claim 1, wherein the exterior light is configured as a brake light.

3. The motor vehicle according to claim 1, wherein the exterior light is configured as a tail light.

4. The motor vehicle according to claim 1, wherein the exterior light is configured as a backup light.

5. The motor vehicle according to claim 1, wherein the exterior light is configured as a direction indicator.

6. The motor vehicle according to claim 1, wherein said at least partially transparent cover forms a part of an outer skin of the motor vehicle.

* * * * *